United States Patent Office 3,245,562
Patented Apr. 12, 1966

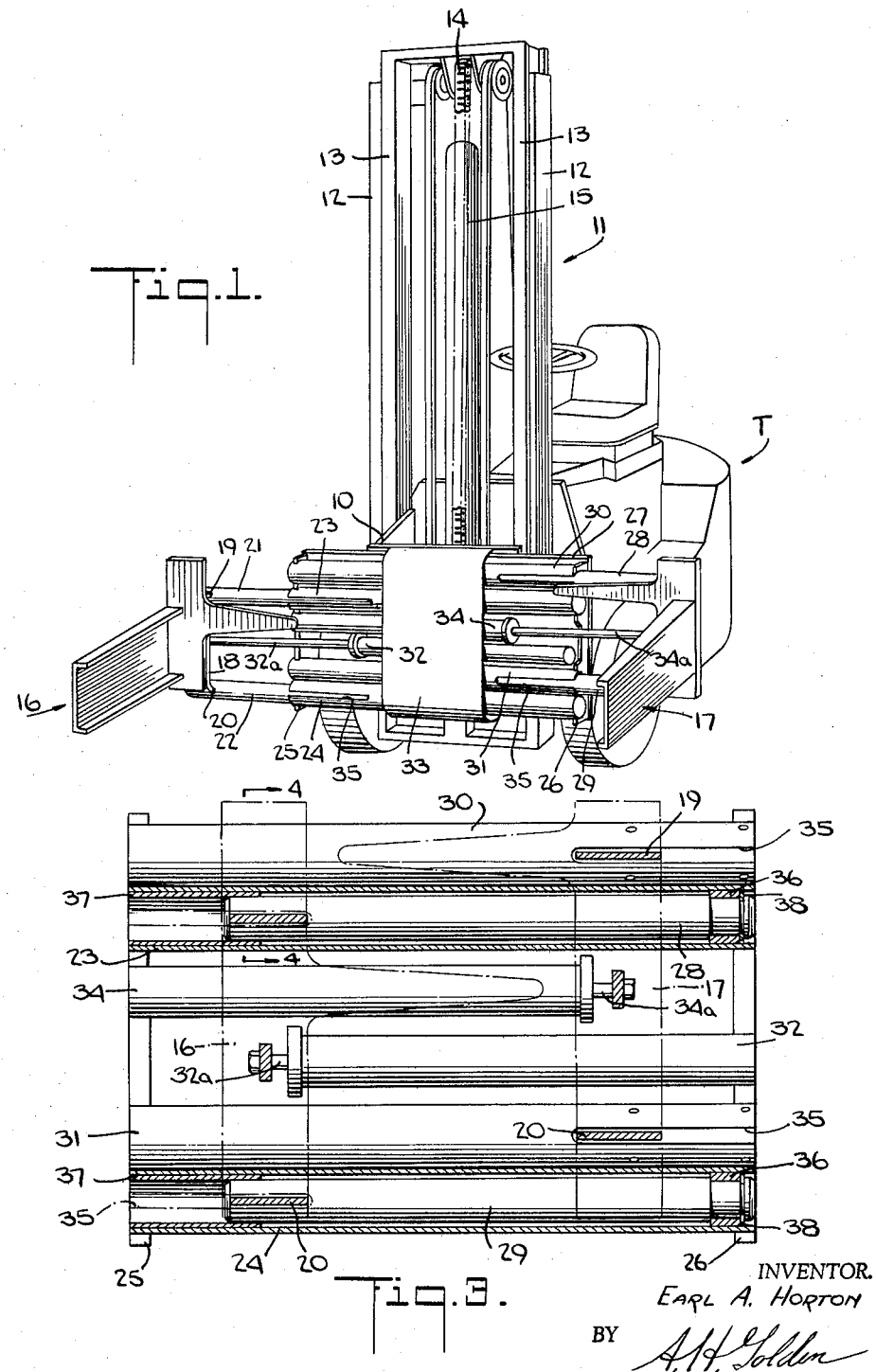

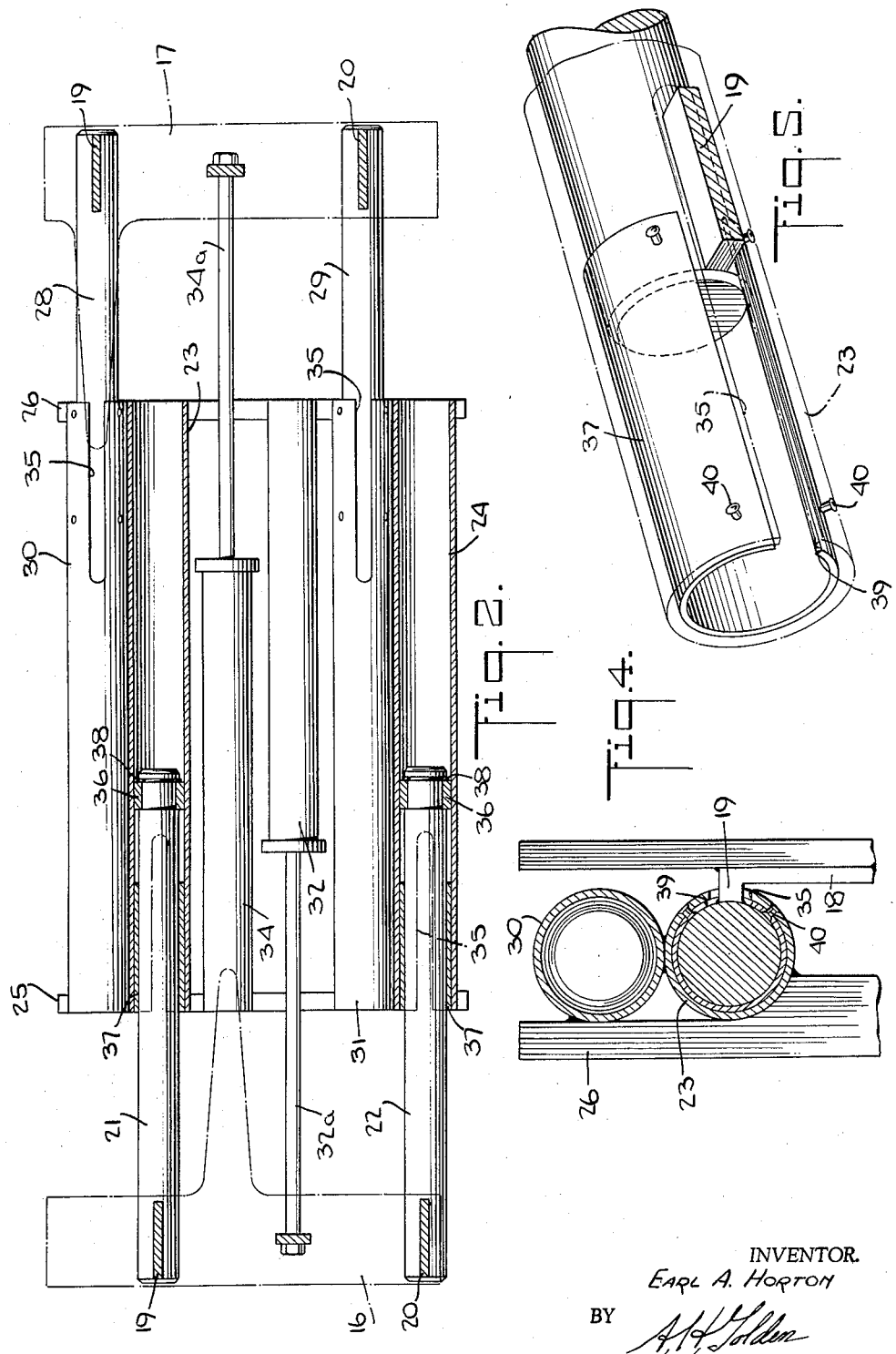

3,245,562
BEARING ARRANGEMENT FOR MOVABLE LOAD
ENGAGING MEMBERS ON A VEHICLE
Earl A. Horton, Philadelphia, Pa., assignor, by mesne
assignments, to Yale & Towne, Inc., New York, N.Y.,
a company of Ohio
Filed Feb. 21, 1962, Ser. No. 174,734
3 Claims. (Cl. 214—653)

This invention relates to an industrial truck of the type incorporating a pair of load engaging members, such as load clamps or forks, which are mounted for transverse movement to allow the members to be moved toward and away from each other to engage or release a load or to adjust the spacing between them, and to allow the members to be side shifted in unison in one direction or the other to facilitate positioning or engaging a load. The invention is directed particularly to the structure for supporting the load engaging members during such movement.

In trucks of this type, the load clamps or forks are commonly supported on shafts which in turn are slidably mounted in horizontally disposed tubular guides. The tubular guides are provided with longitudinally extending slots through which the connecting structure between the clamps or forks and the shafts may extend when the clamps are moved close together. This allows the clamps or forks to have a wide range of movement while the shafts are adequately supported and guided by the tubular guides.

In order to reduce sliding friction between the shafts and the tubular guides, it has been the practice to provide each of the shafts with spaced bearing sleeves or bushings formed of suitable material, such as bronze or nylon, having good bearing properties with the tubular guides. One bearing sleeve is secured to and moves with the entering end of the shaft, and the other bearing is secured to and moves with an intermediate portion of the shaft. This latter bearing is of sufficient length that a substantial portion of the bearing is in engagement with the tubular guide even when the shaft is fully extended relatively to the tubular guide. When the shaft is so extended, a portion of the intermediate bearing extends outwardly of the tubular guide. When the shaft is fully retracted, the intermediate bearing moves completely within the tubular guide to a position spaced from the outer end of the tubular guide.

While this construction provides an operative arrangement, I have found that the arrangement does have certain disadvantages, particularly from the viewpoint of maintenance and cost. Thus, the projection of the intermediate bearings beyond the ends of the tubular guides subjects the bearings to high stresses and distortion. This projection of the intermediate bearing also requires that the bearings be of sufficient length that the portions remaining in the tubular guides are of sufficient area to take the increased stress due to the loss of bearing area by the projection of a portion of the bearings beyond the ends of the tubular guides. Further, because the intermediate bearings in the fully retracted position of the shafts are completely within the tubular guides, the shafts are left unsupported adjacent the outer ends of the guides so that under heavy loads these shafts may actually flex into contact with the tubular guides with resulting increase in friction and wear.

The purpose of this invention is to provide an improved bearing arrangement which eliminates distortion of the bearings eliminates the possibility of direct contact between the shafts and tubular guides due to flexure of the shaft, and at the same time provides greater stability when the shafts are retracted and allows shorter bearings to be used.

To this end, the arrangement of the invention includes a bearing sleeve which is secured to and moves with the entering end of the shaft and a second stationary bearing sleeve which is secured within the outer end of the tubular guide and has sliding engagement with the shaft. The bearing sleeve secured to the tubular guide is slotted coextensively with the slot in the tubular guides to accommodate the connecting structure between the clamp and the shaft as the clamps are moved together. By this arrangement, there is no movement of a bearing sleeve into or out of the tubular guide. Thus, there is no loss of bearing area as the shafts are extended and the bearing sleeve, therefore, may be of shorter length than those used on the intermediate portions of the shafts as heretofore proposed. Further, as the sleeve bearings do not move with the shafts inwardly or outwardly of the end of the tubular guides, they support the shaft at all times against flexing into contact with the tubular guides and provide maximum support for the shaft in the retracted position.

As a feature of the invention, the bearing sleeve is secured within the outer end of the tubular guide by rivets which extend through both the wall of the tubular member and the bearing sleeve and are formed of the same material as the bearing sleeve so as not to interfere with the bearing function of the bearing sleeve.

The invention and its advantages having been broadly described, a more detailed description of the invention is given hereafter by reference to the following drawings, wherein:

FIG. 1 is a perspective view of an industrial truck incorporating a pair of hydraulically operated load clamps mounted in accordance with the invention;

FIG. 2 is a front elevational view, partly in section, of the supporting structure for the clamps, showing the clamping in a fully extended position;

FIG. 3 is a view similar to that of FIG. 2, but showing the clamps in the fully retracted position;

FIG. 4 is a sectional view taken on the line 4—4 of FIG. 3 and

FIG. 5 is a perspective view, partly in phantom, showing a bearing sleeve connected within the outer end of one of the tubular guides in accordance with the invention.

Referring to the drawings and in particular to FIG. 1, the mounting structure of the invention is shown applied to a conventional lift truck T. While the particular truck illustrated is the type described in United States Patent No. 2,795,346, it will be appreciated that the invention may be used on other types and styles of industrial trucks.

It is sufficient to an understanding of the invention to point out that the truck includes a load carriage 10 mounted for vertical movement in the well-known manner on a conventional mast structure 11, which includes a pair of stationary or primary uprights 12 and a pair of movable or secondary uprights 13. The load carriage 10 and the secondary uprights 13 are adapted to be elevated through chains 14 by a hydraulic ram 15 in the conventional manner.

The load carriage 10 is provided with a pair of load clamps 16 and 17 which, as will be described in detail hereafter, are mounted for movement transversely of the load carriage 10 so that they may be moved relatively to one another to engage or release a load, or may be moved in unison transversely of the truck to facilitate the placement and engagement of a load. This latter movement is commonly referred to as side-shifting.

Clamp 16 is secured to a channel-shaped bracket 18 having upper and lower flanges 19 and 20 welded, or otherwise secured to, the outer ends of horizontally disposed upper and lower shafts 21 and 22. Shafts 21 and 22, in turn, are slidably received in upper and lower steel tubular guides 23 and 24. The tubular guides 23 and 24 are rigidly secured at each end to brackets 25 and 26, and the brackets 25 and 26 in turn are rigidly secured to a vertical back plate 27. The back plate 27 is secured to the load carriage 10 so that the whole unit may move vertically with the load carriage.

The clamp 17 is similarly secured to the outer ends of upper and lower horizontally disposed shafts 28 and 29 by means of a flanged bracket similar to the bracket 18, and the shafts 28 and 29 are slidably received in upper and lower steel tubular guides 30 and 31. The tubular guides 30 and 31 are rigidly secured at each end to the brackets 25 and 26.

The clamp 16 is adapted to be moved transversely of the load carriage 10 by means of a horizontally disposed hydraulic ram 32 which is rigidly secured to a support member 33 secured to the back plate 27. Hydraulic ram 32 has a piston rod 32a which is connected to the bracket 18. The clamp 17 is adapted to be moved transversely of the load carriage 10 by means of a horizontally disposed hydraulic ram 34 which is secured to the support 33 and has a piston rod 34a connected to the clamp 17. It will be appreciated that by proper control of the admission of fluid under pressure to the rams 32 and 34, the clamps 16 and 17 may be moved toward or away from one another to engage or release a load, or may be moved transversely in unison in one direction or the other to side shift a load.

During such transverse movement, the clamp 16 is supported and guided through movement of the upper and lower shafts 21 and 22 in the tubular guides 23 and 24, while the clamp 17 is supported and guided through movement of the upper and lower shafts 28 and 29 in the tubular guides 30 and 31. Each of the tubular guides 23, 24, 30 and 31 is provided with a slot 35 which extends inwardly from the outer end thereof and is of a width sufficient to slidably receive the flanges 19 and 20 of the brackets 18 through which the clamps are secured to the shafts, so that the clamps can be moved close together without decreasing the effective length of the tubular guides. It will be noted that the flanges 19 and 20 of the brackets 18 offset the clamps 16 and 17 forwardly of the tubular guides so that the clamps may move in front of the tubular guides with the flanges 19 and 20 of the brackets 18 extending through the slots 35.

In accordance with the invention, sliding friction between each of the supporting shafts and its respective tubular guide is reduced through the provision of a first sleeve bearing 36 which is secured to the entering end of the shaft and slidably engages the inner surface of the tubular guide, as best shown in FIGS. 2 and 3 in connection with the shafts 21 and 22 and their respective tubular guides 23 and 24, and a sleeve bearing 37 which is secured within the outer end of each of the tubular guides and slidably engages the shaft, as also best shown in FIGS. 2 and 3, in connection with the tubular guides 23 and 24. The sleeve bearings 36 and 37 are made of suitable bearing material, such as bronze or nylon. Each of the sleeve bearings 36 is conveniently mounted on a reduced end portion of its shaft and retained thereon by a split ring retainer 38.

As best shown in FIGS. 4 and 5, the bearing sleeves 37 are each provided with a slot 39 which is aligned with the slot 35 in its tubular guide to accommodate the flanges of the connecting brackets 18 when the clamps 16 and 17 are moved close together. In accordance with a feature of the invention, the sleeve bearings 37 are secured within the outer ends of the tubular guides with their slots 39 so aligned with the slots 35 in the tubular guides by means of rivets 40. The rivets 40 extend through the wall of the tubular guide and the sleeve bearing 37 and are formed of the same material as the sleeve bearing 37 so as not to interfere with the bearing function of the sleeve bearings. It will be appreciated that each of the shafts 21, 22, 28 and 29 and its respective tubular guides 23, 24, 30 and 31 is provided with this bearing arrangement.

From the preceding description, it can be seen that there is provided an improved bearing arrangement in which one sleeve bearing is carried by and moves with the inner end of the shaft and the other sleeve bearing is secured within the outer end of the tubular guide. With this improved arrangement, there is no movement or projection of a bearing sleeve out of the tubular guide and the bearing sleeves, therefore, are not subjected to high stresses and distortion as in prior arrangements. Further, when the shafts are fully retracted within the tubular guides, as shown in FIG. 3, the shafts are supported at one end by the bearings 36 and at the other end by the bearings 37 and cannot flex under heavy loads into contact with the tubular guides as is the case of the prior arrangements in which both bearings are carried by and move with the shaft relatively to the tubular guides.

While a preferred form of the invention has been shown and described, it will be appreciated that this is for the purpose of illustration and that changes and modifications can be made therein without departing from the spirit and scope of the invention.

I now claim:
1. In an industrial truck,
 (a) a pair of load engaging members,
 (b) a horizontally disposed cylindrical shaft for each load engaging member,
 (c) connecting means securing each load engaging member to the outer end of its shaft,
 (d) a horizontally disposed cylindrical tubular guide for each shaft secured to said truck for slidably receiving the shaft whereby the load engaging members are supported and guided for horizontal movement toward and away from each other, each tubular guide being slotted longitudinally to accommodate said connecting means as the load engaging members are moved close together,
 (e) an anti-friction bearing sleeve secured to the inner end of each shaft slidably engaging the inner surface of its tubular guide,
 (f) an anti-friction bearing sleeve secured within the outer end of each tubular guide and slidably engaging the outer surface of its shaft interposing a constant bearing area between its said guide and shaft for all relative positions of said guide and shaft, said anti-friction bearing sleeve having a slot aligned with the longitudinal slot in the tubular guide, and
 (g) rams mounted parallel to said tubular guides and having pistons for moving said load engaging members toward and away from each other.

2. In an industrial truck,
 (a) a pair of load engaging members,
 (b) a pair of horizontally disposed cylindrical vertically spaced shafts for each load engaging member,
 (c) connecting means securing each load engaging member to the outer end of its pair of shafts in a position offset forwardly of the shafts,
 (d) a horizontally disposed cylindrical tubular guide for each shaft secured to said truck for slidably receiving the shaft whereby the load engaging members are supported and guided for horizontal movement toward and away from each other, each tubular guide being slotted longitudinally to accommodate said connecting means as the load engaging members are moved close together,
 (e) an anti-friction bearing sleeve secured to the inner end of each shaft slidably engaging the inner surface of its tubular guide,
 (f) an anti-friction bearing sleeve secured within the outer end of each tubular guide and slidably engaging the outer surface of its shaft interposing a constant bearing area between its said guide and shaft for all relative positions of said guide and shaft, said anti-friction bearing sleeve having a slot aligned with the longitudinal slot in the tubular guide, and (g) rams mounted parallel to said tubular guides and having pistons for moving said load engaging members toward and away from each other.

3. In an industrial truck,
(a) a pair of load engaging members,
(b) a horizontally disposed cylindrical shaft for each load engaging member,
(c) connecting means securing each load engaging member to the outer end of its shaft,
(d) a horizontally disposed cylindrical tubular guide for each shaft secured to said truck for slidably receiving the shaft whereby the load engaging members are supported and guided for horizontal movement toward and away from each other, each tubular guide being slotted longitudinally to accommodate said connecting means as the load engaging members are moved close together,
(e) an anti-friction bearing sleeve secured to the inner end of each shaft slidably engaging the inner surface of its tubular guide,
(f) an anti-friction bearing sleeve secured within the outer end of each tubular guide and slidably engaging the outer surface of its shaft interposing a constant bearing area between its said guide and shaft for all relative positions of said guide and shaft, said anti-friction bearing sleeve having a slot aligned with the longitudinal slot in the tubular guide through which said connecting means may extend, said anti-friction bearing sleeve being secured within the outer end of the tubular guide by rivets extending through both the wall of the tubular guide and the bearing sleeve and formed of the same material as the bearing sleeve, and
(g) rams mounted parallel to said tubular guides and having pistons for moving said load engaging members toward and away from each other.

References Cited by the Examiner

UNITED STATES PATENTS

| 2,666,677 | 1/1954 | Miller. | |
|---|---|---|---|
| 2,836,317 | 5/1958 | Oury | 214—653 |
| 2,920,775 | 1/1960 | Schenkelberger | 214—653 |
| 3,008,779 | 11/1961 | Spriggs | 308—238 |
| 3,029,962 | 5/1962 | Didtel | 214—653 X |
| 3,032,353 | 5/1962 | Williams et al. | 280—414 |
| 3,059,888 | 10/1962 | Lie | 248—161 |

FOREIGN PATENTS 694,956   7/1952   Great Britain.

GERALD M. FORLENZA, *Primary Examiner.*

HUGO O. SCHULZ, MORRIS TEMIN, *Examiners.*